(12) United States Patent
Chapelle et al.

(10) Patent No.: US 6,542,980 B1
(45) Date of Patent: Apr. 1, 2003

(54) TIME SLOT DATA MEMORY STORAGE AND ACCESS SYSTEM

(75) Inventors: Gregory P. Chapelle, San Diego, CA (US); Stephane Mailleau, San Diego, CA (US)

(73) Assignee: TRW Inc., Redondo Beach, CA (US)

( * ) Notice: Subject to any disclaimer, the term of this patent is extended or adjusted under 35 U.S.C. 154(b) by 378 days.

(21) Appl. No.: 09/637,342

(22) Filed: Aug. 11, 2000

(51) Int. Cl.[7] ............................................. G06F 12/00
(52) U.S. Cl. .................... 711/202; 711/219; 711/167; 711/202; 711/213
(58) Field of Search .......................... 711/202, 220, 711/219, 217, 218, 213, 4, 167, 154, 173; 370/321, 337, 347, 442; 709/231

(56) References Cited

U.S. PATENT DOCUMENTS

| | | | |
|---|---|---|---|
| 5,475,681 A | * 12/1995 | White et al. | 370/349 |
| 5,706,224 A | 1/1998 | Srinivasan et al. | 365/49 |
| 5,708,790 A | 1/1998 | White et al. | 711/203 |
| 5,714,878 A | 2/1998 | Saito et al. | 324/121 R |
| 5,721,859 A | 2/1998 | Manning | 305/236 |
| 5,854,941 A | * 12/1998 | Ballard et al. | 710/5 |
| 5,859,960 A | * 1/1999 | Kurihara et al. | 714/7 |
| 6,233,648 B1 | * 5/2001 | Tomita | 711/4 |
| 6,311,193 B1 | * 10/2001 | Sekido | 707/202 |

* cited by examiner

*Primary Examiner*—Do Hyun Yoo
*Assistant Examiner*—B. R. Peugh
(74) *Attorney, Agent, or Firm*—Harness, Dickey & Pierce, P.L.C.

(57) ABSTRACT

A memory access system maps a block of data between a time stamp and an addressable memory location in a manner which mimics actual transmission slot timing. The system includes a slot time module, a calculation conversion module, and an addressing module. The slot time module determines the time stamp for the block of data, and the calculation conversion module generates a preliminary memory location based on the time stamp and a predetermined conversion factor. The predetermined conversion factor has a preliminary component which can be removed by the addressing module such that an addressable memory location is generated. The calculation conversion module has a base conversion module, a padding module, a left-shift module; and a summation module for constructing the conversion factor and applying the conversion factor to the retrieved time stamp.

17 Claims, 7 Drawing Sheets

TIME SLOT DATA MEMORY STORAGE AND ACCESS SYSTEM

BACKGROUND OF THE INVENTION

1. Field of the Invention

This invention relates generally to processing time division multiple access communications system data and, more particularly, to a system for mapping a block of data between a communications slot time stamp and an addressable memory location.

2. Discussion of the Related Art

A common thread to cellular telephone communications, internet packet communications, modem communications, wireless LANS, etc. is the ever increasing need to process large amounts of communications data. Communications data comes in many forms, and the benefits associated with efficiently processing such data are abundantly clear. Time division multiple access (TDMA) provides a mechanism for sharing a transmission channel among multiple sources by allocating specific time slots to each source of data. This "transmission slot timing" approach to handling communications data is quite common in the industry.

A unique problem arises, however, with respect to storage and retrieval of TDMA data. A particular concern is over removing processing bottlenecks at the storage and retrieval stages of data processing. For example, in a random access memory configuration, the word count or size of a data block must typically be known before an address location can be obtained. This requires knowledge of the content of the data block and substantially adds to processing time and resources. A random access approach also fails to appreciate the transmission slot timing nature of TDMA data. It is therefore desirable to provide a computerized method and system for storing and retrieving TDMA data that does not lead to processing bottlenecks associated with random access memory.

Approaches to sequential storage and retrieval of TDMA data have been suggested. Under such a system, a time stamp for a block of TDMA data contained in a communications slot would be converted into a memory address location without the need to know the content of the data. The data would be sequentially read into and out of a computer readable memory, such as a drum memory, and when the end of the memory is reached, the addressing mechanism would proceed to the beginning of the memory. Thus, by dividing the time stamp by a conversion factor representing the number of clock periods within a time slot, a sequential address location can be obtained for each time slot. For example, for a system in which the time counter is changed every 100 nanoseconds (or a 10 MHz clock rate) wherein the slot time is 13 micro-seconds, a TIME/130 calculation will be performed to determine an addressable memory location. The result is that for every 130 clock cycles, the time stamp for a communications slot will be converted into a sequential address in the drum memory. By so doing, TDMA data can be stored and retrieved in a manner which mimics the actual transmission slot timing of the data.

A difficulty exists, however, with implementing sequential storage and retrieval of TDMA data. Particularly, computerized division operations are costly and require many clock cycles to perform the necessary loops and processing decisions. Division also requires an unknown number of adding operations and shifting operations depending on the given time stamp. It is therefore desirable to provide a mechanism for mapping a block of TDMA data between a time stamp and a memory address which does not have the aforementioned division problems. Furthermore, since a counter is used to assign the time stamp to the data block, it is also desirable to account for counter roll-over in making the calculation.

SUMMARY OF THE INVENTION

In accordance with the teachings of the present invention, a memory access system for mapping a block of data between a time stamp and an addressable memory location is disclosed. In one embodiment, the system includes a slot time module, a calculation conversion module, and an addressing module. The slot time module determines the time stamp for the block of data. The calculation conversion module generates a preliminary memory location based on the time stamp and a conversion factor, where the conversion factor has a preliminary component. The addressing module removes the preliminary component from the preliminary memory location such that an addressable memory location is generated.

The calculation conversion module has a base conversion module for generating a partial address based on the time stamp and a base factor. A padding module generates a padded partial address based on the partial address and a predetermined number of coding bits. The calculation conversion module further includes a left-shift module for generating a left-shifted partial address based on the partial address and the predetermined number of coding bits. A summation module adds the padded partial address to the left-shifted partial address such that a preliminary memory location is generated. Preferably, the calculation conversion module further includes a scaling module for right-shifting the time stamp by one bit.

Further in accordance with the present invention, a computerized method for determining an addressable memory location for a block of data is disclosed. The method includes the steps of determining a time stamp for the block of data, and generating a preliminary memory location based on the time stamp and a conversion factor. The conversion factor has a preliminary component, and the method includes the step of removing the preliminary component from the preliminary memory location such that the addressable memory location is generated.

Additional objects, features and advantages of the invention will become apparent from the following description and the appended claims when taken in connection with the accompanying drawings.

DETAILED DESCRIPTION OF THE PREFERRED EMBODIMENTS

The following discussion of the preferred embodiments directed to mapping a block of data between a time stamp and an addressable memory location is merely exemplary in nature, and is in no way intended to limit the invention or its applications or uses.

Figure 1:
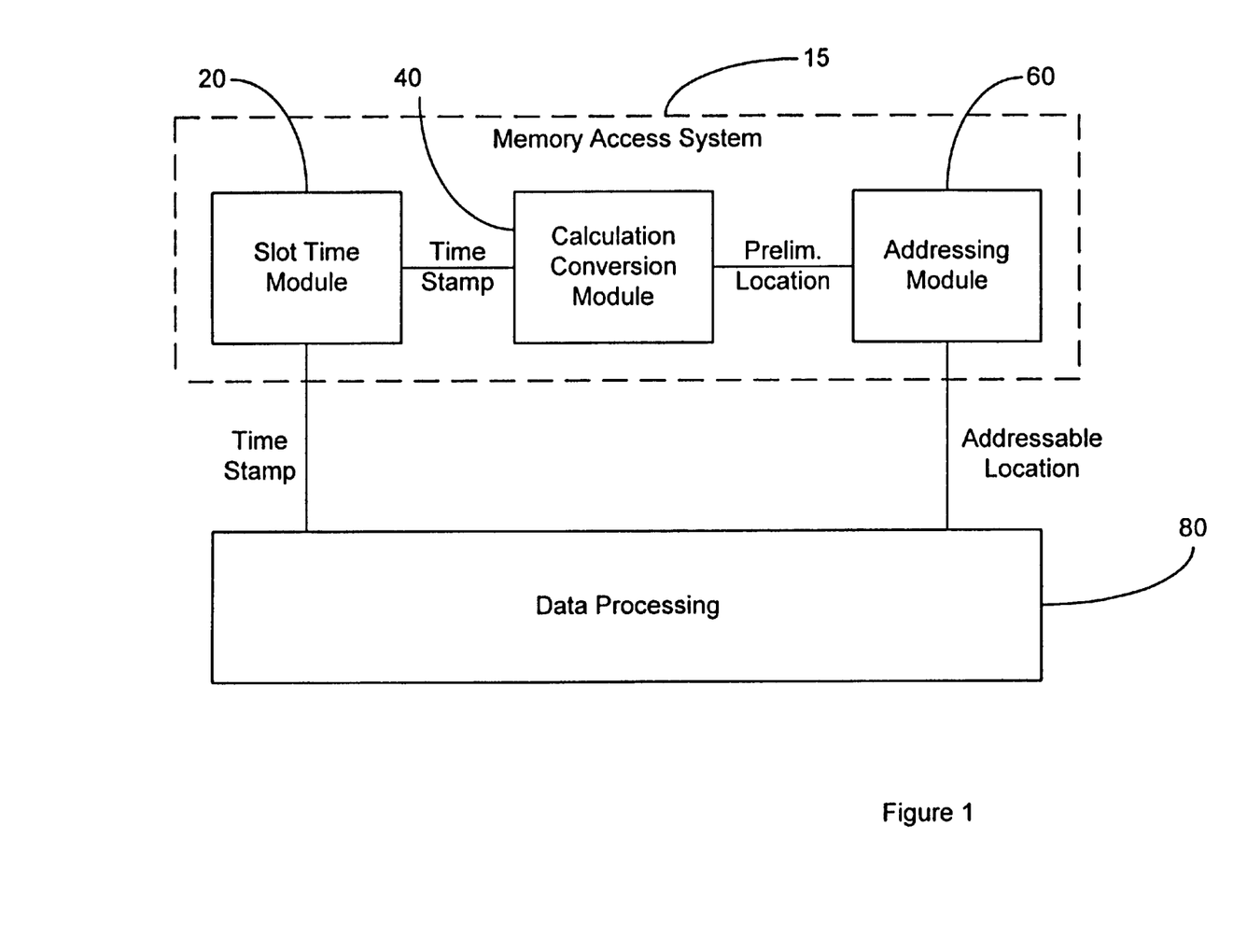
FIG. 1 is a block diagram of a memory access system for mapping a block of data between a time stamp and an addressable memory location according to the present invention.

Turning now to FIG. 1, a memory access system for mapping a block of data between a time stamp and an addressable memory location is shown generally at 15. The system 15 has a slot time module 20, a calculation conversion module 40, and an addressing module 60. Generally, slot time module 20 determines the time stamp for the block of data, and the calculation conversion module 40 generates a preliminary memory location based on the time stamp and a conversion factor, where the conversion factor has a preliminary component. The calculation conversion module 40 uses the preliminary component to convert the processing intensive division calculation associated with mapping TDMA data into more manageable multiplication, addition and shifting operations. The addressing module 60 removes the preliminary component from the preliminary location such that an addressable memory location is generated. Memory access system 15 allows data processing module 80 to sequentially store and retrieve TDMA data to and from memory without reference to the content of the data. The result is an efficient mechanism for storage and retrieval which mimics the actual transmission slot timing of TDMA data.

Figure 2:
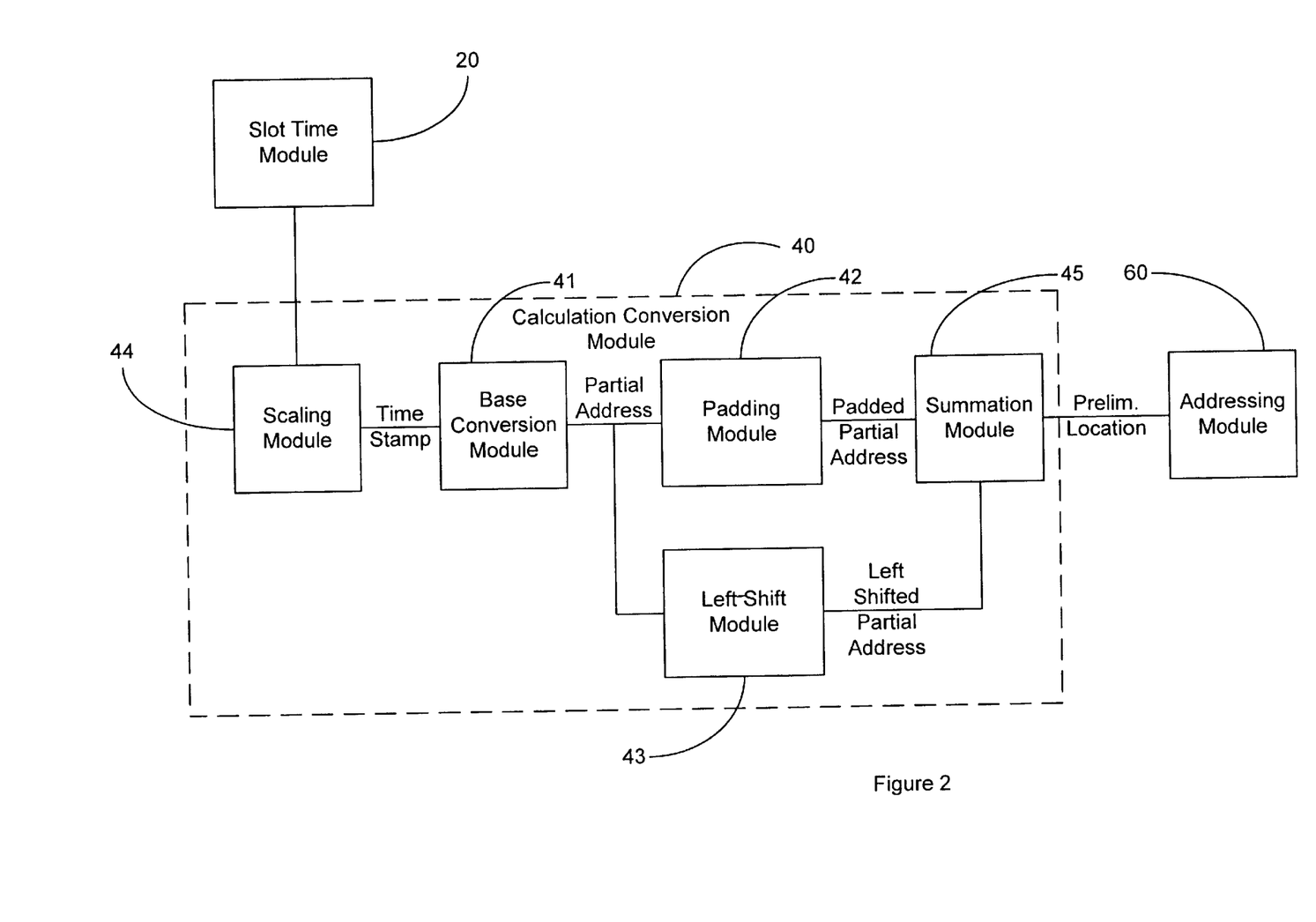
FIG. 2 is a block diagram of a calculation conversion module according to the present invention.

FIG. 2 shows a more detailed block diagram of calculation conversion module 40. Specifically, calculation conversion module 40 includes a base conversion module 41 for generating a partial address based on the time stamp and a predetermined base factor. The base factor is a number which can be readily manipulated to create the desired conversion factor. It will be appreciated that the conversion factor is designed to have a preliminary component (PC) which will convert the undesirable division calculation into a more manageable multiplication operation. For example, the time clock counter (TIME) in a typical communications data processing system will be a 24-bit counter, whose least significant bit is toggled at a 10 MHz rate, wherein the target memory has 4096 locations for data. The 10 MHz rate translates into a 100 ns clock period, and yields a slot time of 13 microseconds for LINK-16 waveforms. Dividing TIME by the slot duration (slot time divided by clock period), therefore results in a TIME/130 calculation.

The goal of the conversion factor (CF) is therefore to convert the TIME/130 calculation into a $$\frac{TIME \times CF}{PC},$$

where CF/PC=1/130 and the resulting operation is substantially less difficult to execute. Thus, the base factor serves as a building block for constructing the ultimate conversion factor. It will be appreciated that construction of the conversion factor is further achieved via padding module 42 and left-shift module 43. Specifically, choosing a preliminary component of $2^{24}$, and scaling the time stamp by 2 with scaling module 44 results in a multiply of TIME by $2^{24}/65=258,111.0153=CF$, or approximately 258,111. The binary representation of 258,111 is given by 0000 0011 1111 0000 0011 1111, which is equivalent to multiplying by 63 (binary 11 1111), and adding the result to itself, shifted left by 12 bits. The preferred base factor is therefore 63. Therefore, after multiplication by the base factor at base conversion module 41, padding module 42 generates a padded partial address based on the partial address and a predetermined number of coding bits. The left-shift module 43 generates a left-shifted partial address based on the partial address and the predetermined number of coding bits. Calculation conversion module 40 further includes a summation module 45 for adding the padded partial address to the left-shifted partial address such that a preliminary memory location is generated. Calculation conversion module 40 therefore constructs the predetermined conversion factor and applies it to the retrieved time stamp to generate the preliminary memory location.

Figure 3:
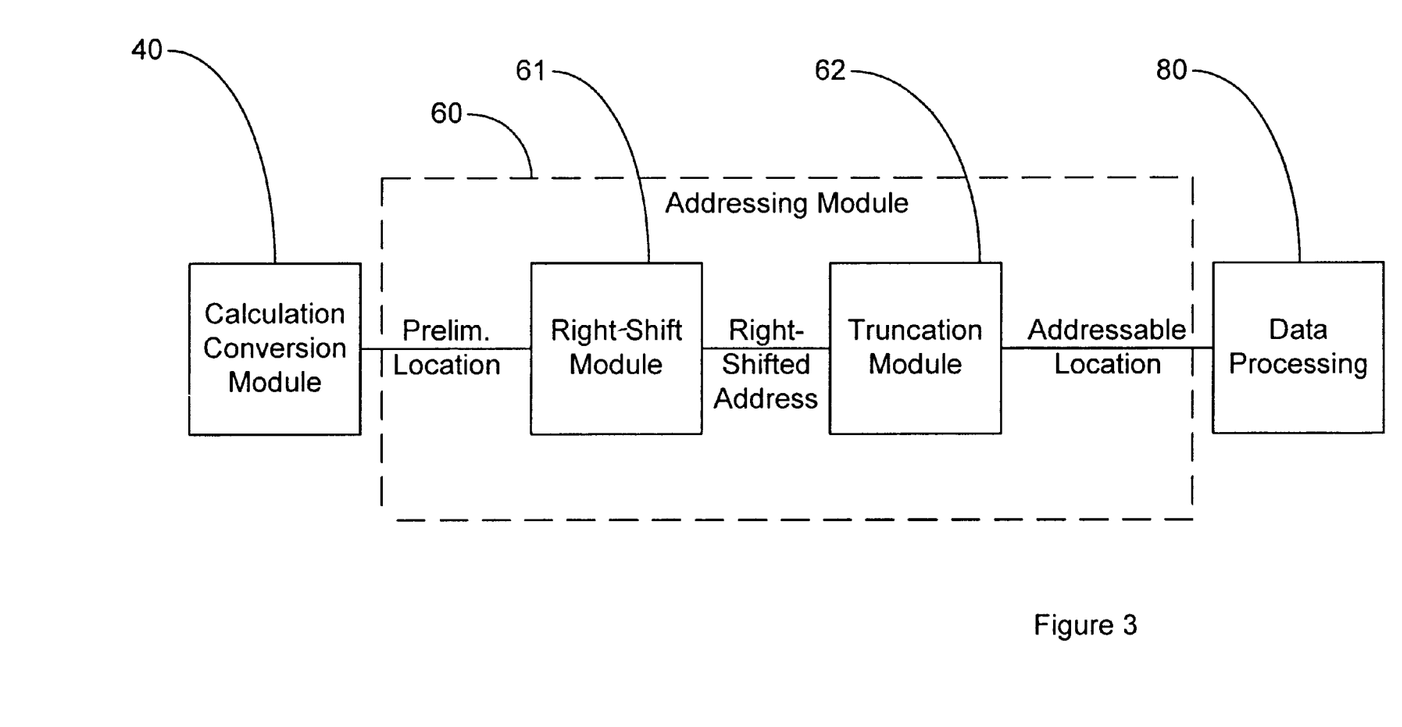
FIG. 3 is a block diagram of an addressing module according to the present invention.

Turning now to FIG. 3, addressing module 60 is shown in greater detail. Addressing module 60 includes a right-shift module 61 for generating a right-shifted address based on the preliminary memory location and a predetermined number of accuracy bits. Right-shift module 61 right-shifts the preliminary memory location by the predetermined number of accuracy bits, and thereby divides the preliminary memory location by two raised to the predetermined number of accuracy bits. This function removes the preliminary component from the preliminary location such that the remaining portion approximates a divide by ($2^{24}/258,111=65.000038$), or with the division by the predetermined scaling factor, 130.0000076. The associated error is therefore smaller than the counter precision and is never perceived by the rest of the system. The addressing module 60 further includes a truncation module 62 for generating an addressable memory location based on the right-shifted address and a predetermined number of least significant address bits. Specifically, truncation module 62 truncates the right-shifted address to the predetermined number of least significant address bits.

Figure 4:
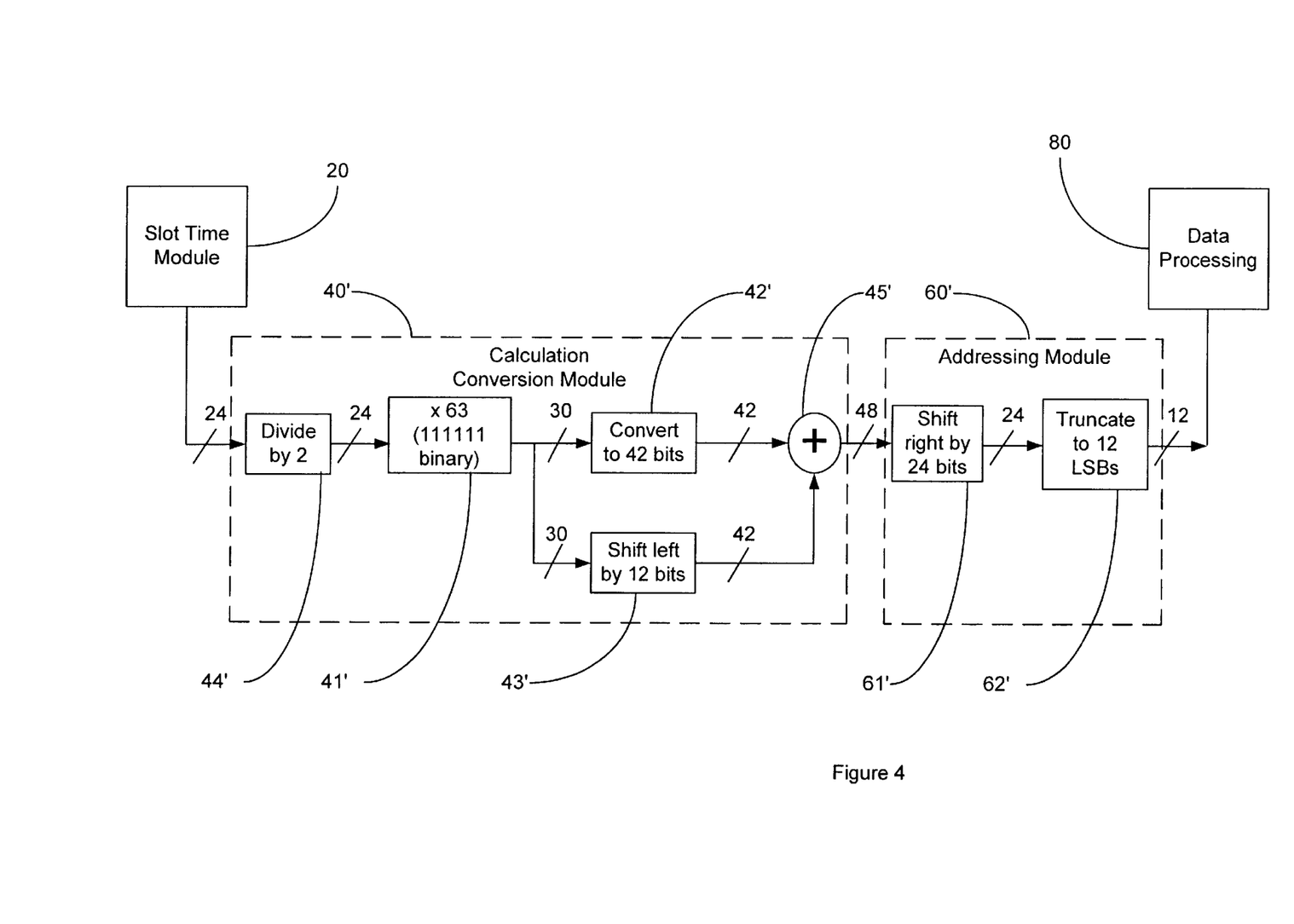
FIG. 4 is a block diagram of a memory access system for mapping a block of data between a time stamp and an addressable memory location according to a preferred embodiment of the present invention.

Turning now to FIG. 4, a preferred calculation conversion module 40' and addressing module 60' are shown. It will be appreciated that the connections to each block indicate the number of bits to carry. It will further be appreciated that the number of bits is generally dictated by system parameters, and that other bit configurations may be readily employed without parting from the nature and scope of the invention. Specifically, calculation conversion module 40' divides the time stamp by two at scaling module 44'. Scaling module 44' therefore right-shifts the time stamp by 1 bit. The result is that the desired calculation is a division by 65 as opposed to 130. Base conversion module 41' multiplies the modified time stamp by 63 in order to begin construction of the predetermined conversion factor and application of the conversion factor to the time stamp. Padding module 42' therefore converts the partial address retrieved from the base conversion module 41' to a 42-bit result, and the left-shift module 43' left-shifts the partial address by 12-bits to obtain a 42-bit result. The two results are added at summation module 45' and a 48 bit preliminary memory location is obtained.

It can further be seen that the preferred addressing module 60' includes a right-shift module 61' for right-shifting the preliminary memory location by 24 bits to execute a divide by $2^{24}$. The result is a 24-bit right-shifted address which can be truncated to the 12 least significant bits by truncation module 62' to create a 12-bit addressable location. Truncation is required because the division result is the 12-bit module 4096 result obtained from the bits (25:36), from the full 48-bit calculation result.

Figure 5:
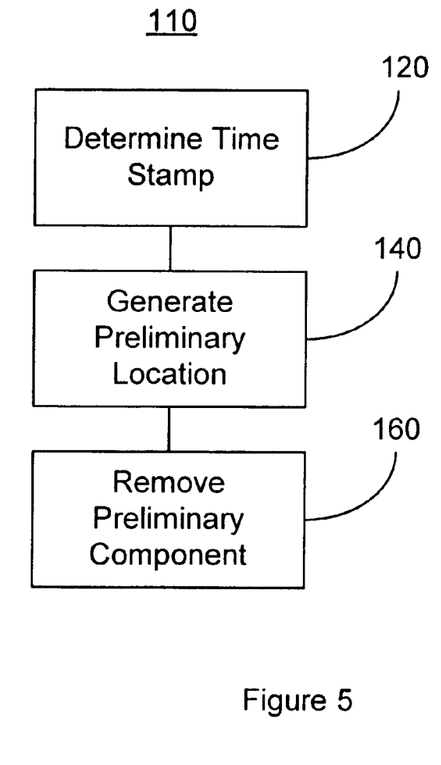
FIG. 5 is a flowchart of a computerized method for determining an addressable memory location for a block of data according to the present invention.
Figure 6:
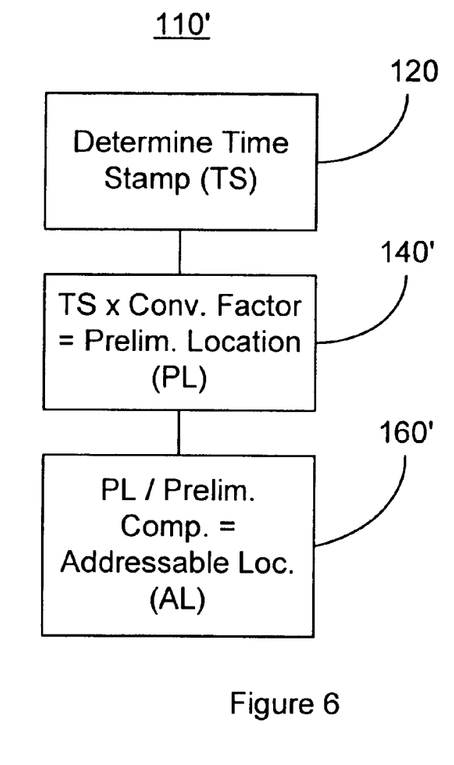
FIG. 6 is a flowchart of a computerized method for determining an addressable memory location for a block of data according to a preferred embodiment of the present invention.

Turning now to FIG. 5, a computerized method 110 for determining an addressable memory location for a block of data is shown for programming purposes. It will be appreciated that the method 110 and the above-described memory access system 15 can be implemented by microprocessors, shift registers, binary adders, and memory devices well known in the art. Generally, method 110 includes the step 120 of determining a time stamp for the block of data, and step 140 of generating a preliminary memory location based on the time stamp and a predetermined conversion factor. As already discussed, the conversion factor has a preliminary component which is removed at step 160 such that the addressable memory location is generated. As shown in FIG. 6, at step 140' the time stamp is multiplied by the conversion factor, and at step 160' the preliminary memory location is divided by the preliminary component.

Figure 7:
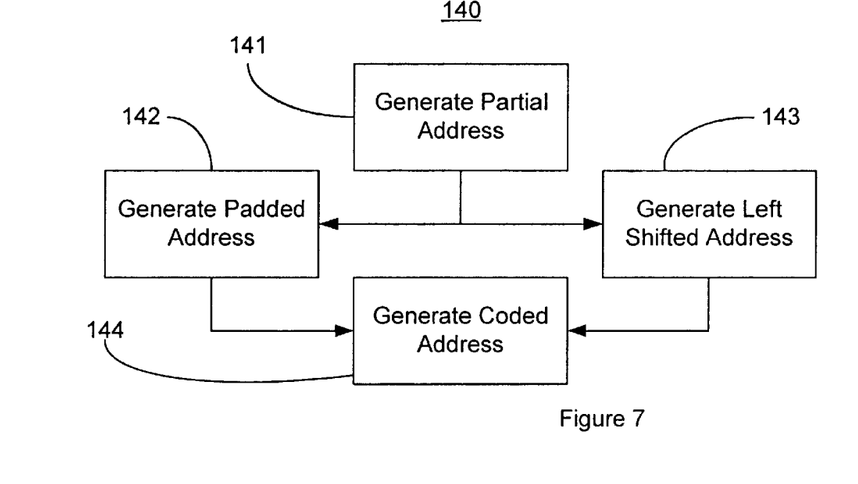
FIG. 7 is a flowchart of a process for generating a preliminary memory location according to the present invention.

Turning now to FIG. 7, the step 140 of generating the preliminary memory location is shown in greater detail. It can be seen that at step 141 a partial address is generated based on the time stamp and a predetermined base factor. A padded partial address is generated at step 142 based on the partial address and a predetermined number of coding bits, and at step 143 a left-shifted partial address is generated based on the partial address and the predetermined number of coding bits. At step 144 the padded partial address is added to the left-shifted partial address such that the preliminary memory location is generated.

Figure 8:
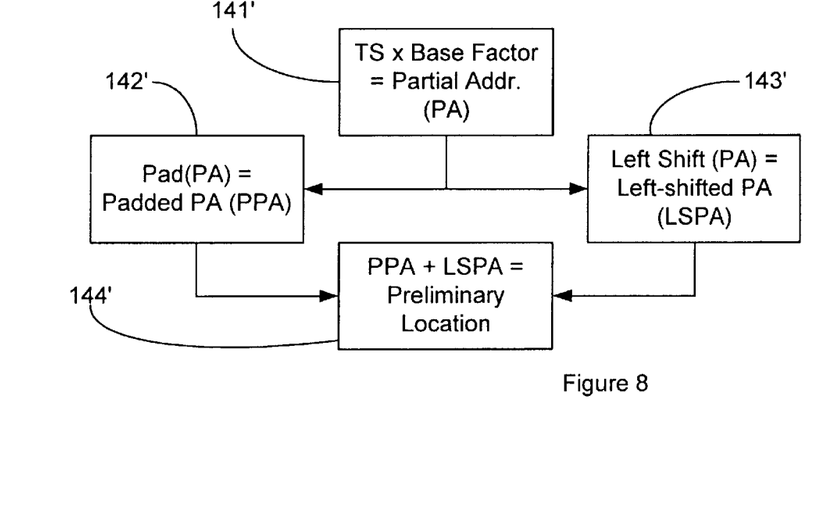
FIG. 8 is a flowchart of a process for generating a preliminary memory location according to a preferred embodiment of the present invention.

As shown in FIG. 8, it is preferred that the partial address is generated by multiplying the time stamp by a predetermined base factor at step 141'. Steps 142' and 143' demonstrate padding, and left-shifting the resulting partial address, respectfully. At step 144', summation of the padded partial address with the left-shifted partial address is shown in greater detail. Thus, the predetermined conversion factor, including the predetermined preliminary component, can be constructed and applied to the retrieved time stamp in a manner that requires substantially less processing resources than required under conventional approaches.

Figure 9:
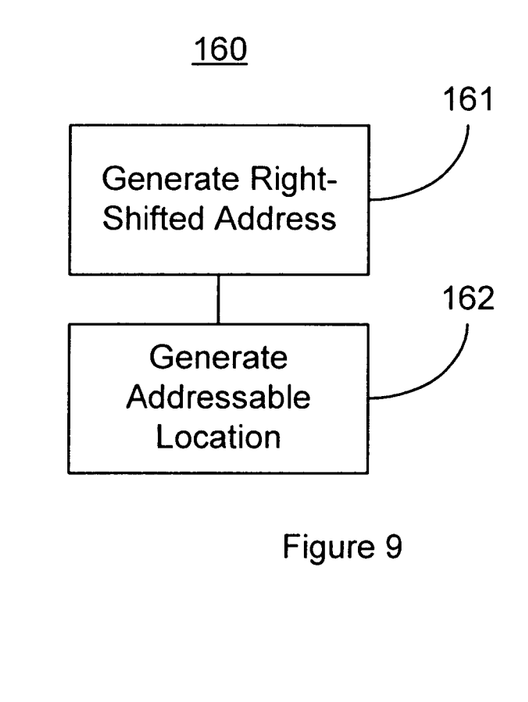
FIG. 9 is a flowchart of a process for removing a preliminary component from a preliminary memory location according to the present invention.
Figure 10:
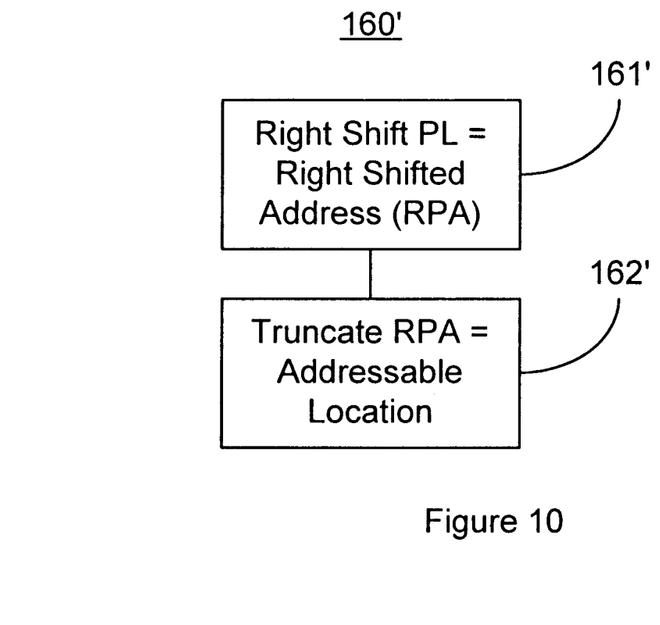
FIG. 10 is a flowchart of a process for removing a preliminary component from a preliminary memory location according to a preferred embodiment of the present invention.

The step 160 of removal of the preliminary component is shown in greater detail in FIG. 9. Generally, it will be appreciated that the preliminary memory location is divided by the preliminary component. More specifically, step 161 demonstrates that a right-shifted address is generated based on the preliminary memory location and a predetermined number of accuracy bits. At step 162, the addressable memory location is generated based on the right-shifted address and a predetermined number of address bits. FIG. 10 shows a preferred approach 160' to step 160. It can be seen that at step 161', the preliminary location is right-shifted by the predetermined number of accuracy bits, wherein the preferred number of accuracy bits is 24. At step 162' the right-shifted address is truncated to the predetermined number of least significant address bits.

Converting the TIME/130 calculation into more manageable multiplication operations substantially reduces the required processing resources and increases processing speed. Processing times associated with drum memory access bottlenecks have been reduced from milliseconds to nanoseconds. The above system and method can be applied to TDMA communications data of all types and waveforms such as LINK-16 waveforms requiring high sampling precision. Furthermore, all discontinuities associated with counter-roundoff and rollover have been eliminated.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A memory access system for mapping a block of data between a time stamp and an addressable memory location, the system comprising:

a slot time module for determining the time stamp for the block of data;

a calculation conversion module for generating a preliminary memory location based on the time stamp and a conversion factor, the conversion factor having a preliminary component; and an addressing module for removing the preliminary component from the preliminary memory location such that an addressable memory location is generated.

2. The system of claim 1 wherein the calculation conversion module includes:

a base conversion module for generating a partial address based on the time stamp and a base factor;

a padding module for generating a padded partial address based on the partial address and a predetermined number of coding bits;

a left-shift module for generating a left-shifted partial address based on the partial address and the predetermined number of coding bits; and a summation module for adding the padded partial address to the left-shifted partial address such that the preliminary memory location is generated.

3. The system of claim 2 further including a scaling module for dividing the time stamp by a predetermined scaling factor.

4. The system of claim 3 wherein the scaling module right-shifts the time stamp by one bit.

5. The system of claim 1 wherein the addressing module includes:

a right-shift module for generating a right-shifted address based on the preliminary memory location and a predetermined number of accuracy bits; and a truncation module for generating the addressable memory location based on the right-shifted address and a predetermined number of address bits.

6. The system of claim 5 wherein the right-shift module right-shifts the preliminary memory location by the predetermined number of accuracy bits.

7. The system of claim 5 wherein the truncation module truncates the right-shifted address to the predetermined number of address bits.

8. A calculation conversion module for generating an addressable location for a block of data based on a time stamp and a conversion factor, the calculation conversion module comprising:

a scaling module for right-shifting the time stamp;

a base conversion module for generating a partial address based on the time stamp and a base factor;

a padding module for generating a padded partial address based on the partial address and a predetermined number of coding bits;

a left-shift module for generating a left-shifted partial address based on the partial address and the predetermined number of coding bits; and a summation module for adding the padded partial address to the left-shifted partial address such that a preliminary memory location is generated.

9. A computerized method for determining an addressable memory location for a block of data, the method comprising the steps of:

determining a time stamp for the block of data;

generating a preliminary memory location based on the time stamp and a conversion factor, the conversion factor having a preliminary component; and removing the preliminary component from the preliminary memory location such that the addressable memory location is generated.

10. The method of claim 9 further including the step of multiplying the time stamp by the conversion factor.

11. The method of claim 10 further including the steps of:

generating a partial address based on the time stamp and a base factor;

generating a padded partial address based on the partial address and a predetermined number of coding bits;

generating a left-shifted partial address based on the partial address and the predetermined number of coding bits; and adding the padded partial address to the left-shifted partial address such that the preliminary memory location is generated.

12. The method of claim 11 further including the step of dividing the time stamp by a predetermined scaling factor.

13. The method of claim 12 further including the step of right-shifting the time stamp by one bit.

14. The method of claim 9 further including the step of dividing the preliminary memory location by the preliminary component.

15. The method of claim 14 further including the steps of:

generating a right-shifted address based on the preliminary memory location and a predetermined number of accuracy bits; and generating an addressable memory location based on the right-shifted address and the predetermined number of address bits.

16. The method of claim 15 further including the step of right-shifting the preliminary memory location by the predetermined number of accuracy bits.

17. The method of claim 15 further including the step of truncating the right-shifted address to the predetermined number of address bits.

* * * * *